Oct. 23, 1951     J. L. ZAR     2,572,556
LONG-SCALE ELECTRICAL MEASURING INSTRUMENT
Filed June 14, 1946     2 SHEETS—SHEET 1
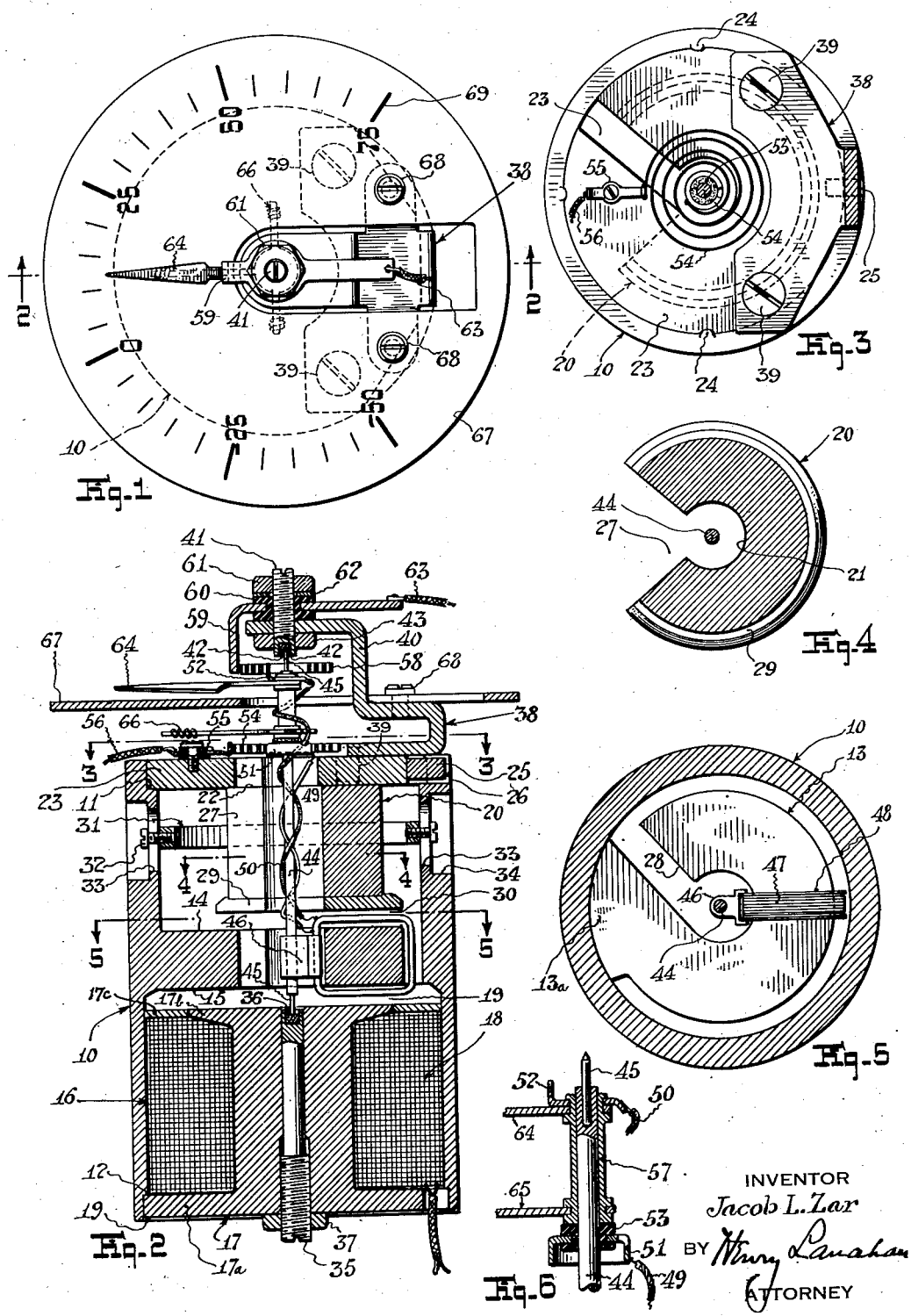
INVENTOR
Jacob L. Zar
BY Henry Lanahan
ATTORNEY Oct. 23, 1951 J. L. ZAR 2,572,556
LONG-SCALE ELECTRICAL MEASURING INSTRUMENT
Filed June 14, 1946 2 SHEETS—SHEET 2
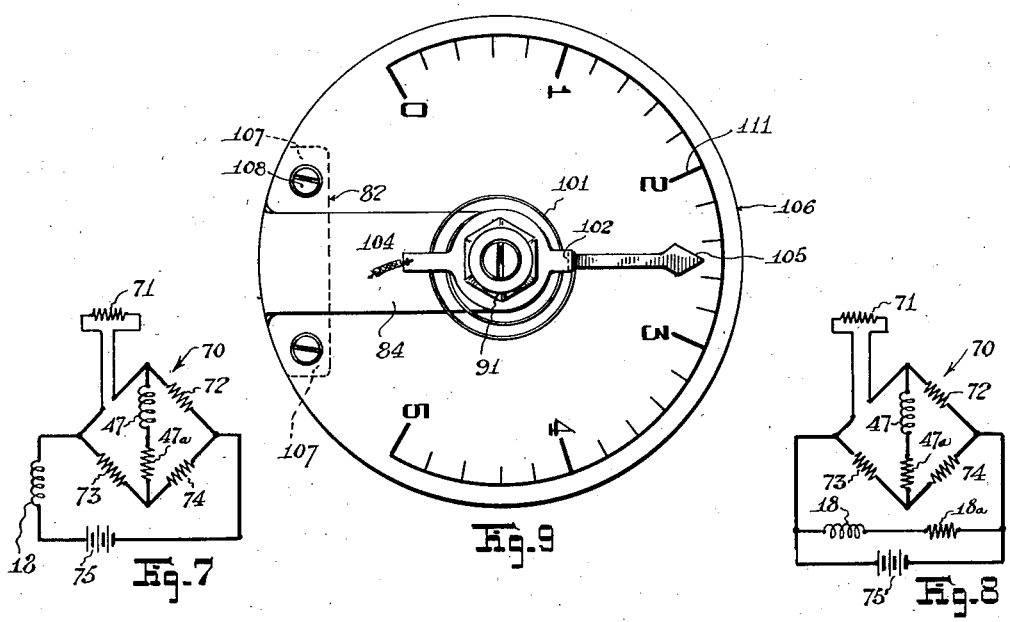
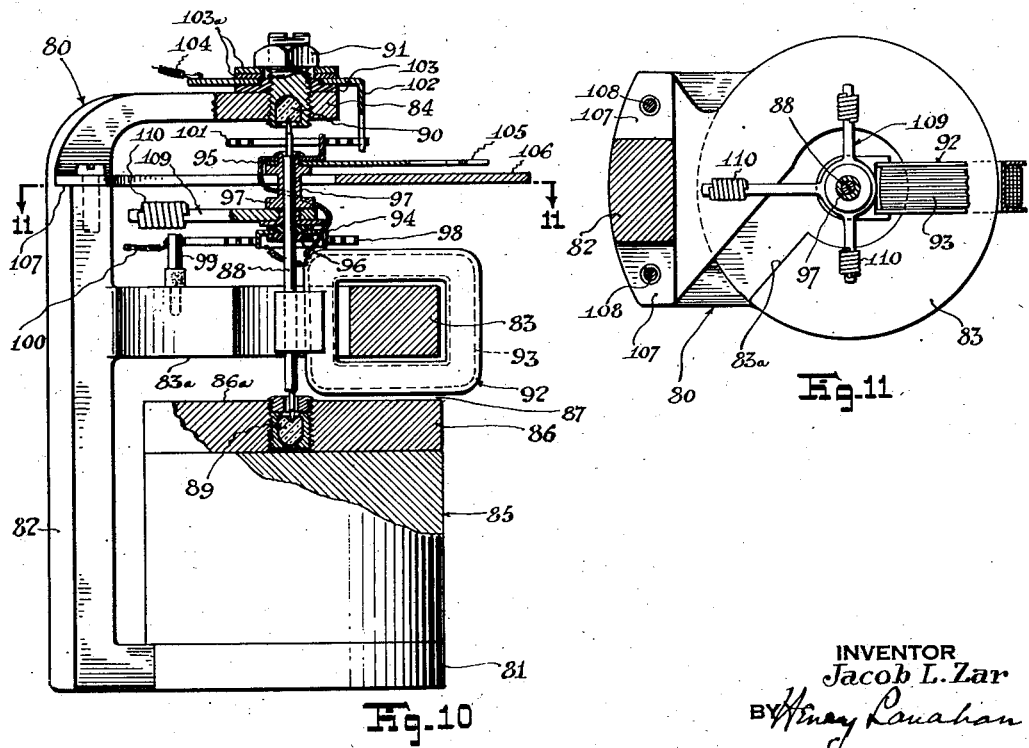
INVENTOR
Jacob L. Zar
BY
ATTORNEY Patented Oct. 23, 1951

2,572,556

UNITED STATES PATENT OFFICE 2,572,556

LONG-SCALE ELECTRICAL MEASURING INSTRUMENT

Jacob L. Zar, Orange, N. J., assignor to Thomas A. Edison, Incorporated, West Orange, N. J., a corporation of New Jersey Application June 14, 1946, Serial No. 676,613

10 Claims. (Cl. 171—95)

This invention relates to novel forms of direct-current measuring instruments of the moving-coil type and to novel electric-meter systems which are energized by a direct-current source for measuring resistance or any condition or quantity representable in terms of resistance. More particularly, my invention relates to novel such instruments and meter systems which have long scale ranges—i. e., scale ranges substantially greater than 180°—and to novel such meter systems which are compensated for changes in the voltage of the current source.

A distinctive feature of the moving coil types of instruments according to my invention lies in providing an effective magnetic field parallel to the pivot axis of the moving coil for torque reaction with a portion of the coil transverse to the pivot axis. By so arranging the effective magnetic field I am able to provide d'Arsonval forms of current- and voltage-measuring instruments which have very simple mechanical construction, less rigid manufacturing tolerances, inherently greater accuracy and a long scale range of the order of 250°. Additionally, I have found that this instrument may be readily compensated for use in an ohmmeter circuit to measure resistance, or conditions or quantities representable in terms of a resistance, without encountering any substantial error in the indications due to changes in the voltage of the current source.

The compensated meter system of my invention herein particularly described is adapted for measuring temperature, as on an aircraft, and is illustrative of the different applications in which systems of this character may be employed. In measuring systems of the ohmmeter type a circuit—typically a Wheatstone bridge—is energized by a direct-current source and comprises a resistance to be measured which, as the same is varied, produces corresponding current variations in a part of the circuit. In this part of the circuit there is placed a measuring instrument which is calibrated in terms of the resistance or the condition or quantity under measurement. In the present illustrative embodiment, temperature is measured in terms of a current controlled by a resistance device responsive to temperature, which may be a resistance bulb according to the Kelly Patent No. 2,398,892. But in these systems the current is a function as well of the voltage of the current source, and inasmuch as the voltage of the source varies independently of the temperature being measured the system must be compensated so that the indications are not influenced substantially by variations in the voltage supply. This has been accomplished heretofore by the use of ratiometers which measure the ratio between two currents but ratiometers have a relatively short scale range typically of the order of 120°. An object of the present invention is to provide a practical form of compensated ohmmeter system and a compensated measuring instrument for such a system which has a long-scale indicating range.

In the present instruments the moving coil is pivotally mounted and is biased in one direction by two "torque" springs which also conduct the current to and from the coil. In the compensated form of these instruments according to my invention, an effective driving torque is produced which is a function substantially only of the quantity being measured by subjecting the moving coil to one torque component controlled as a function of the variable resistance and the supply voltage and also to a compensating torque component controlled solely as a function of the supply voltage. This compensating component counteracts substantially the torque effects on the moving coil produced by the current variations in the coil which are caused by the variations in the supply voltage. Preferably, this effective driving torque comprises a component produced by the reaction of the coil with a uniform magnetic field of fixed value and a second component produced by the reaction of the coil with a second uniform magnetic field but of varying magnitude depending on the voltage of the current source, with the second component working in opposition to the first. As will be hereinafter apparent, by utilizing this principle I am able to substantially compensate the meter system for voltage changes over wide voltage ranges. Also, this principle lends itself to the construction of a meter wherein the mechanical features which determine the accuracy of the meter can be readily held to close tolerances in production.

Other objects and features of my invention are to provide a compensated meter having uniform and stable characteristics that can be used with a Wheatstone bridge and resistance bulb to give temperature indications which are independent of supply voltage, to provide such a meter system wherein the indicator is very sensitive to the temperature of the bulb and to provide such an indicator which consumes very little power.

It is another object of my invention to provide a long-scale moving-coil type of measuring instrument which has a high sensitivity.

Further objects are to provide instruments of the character mentioned which are compact, small in size and relatively cheap to manufacture, and to provide such instruments which have a high inherent accuracy without need for manual adjustments to calibrate them to track a printed scale.

These and other objects and features of my invention will be apparent from the following description and the appended claims.

In the description of my invention reference is had to the accompanying drawings, of which:

Figure 1 is a front view of a compensated form of indicating instrument according to my invention;

Figure 2 is an axially sectional view taken substantially on the line 2—2 of Figure 1;

Figure 3 is a fractional section taken substantially on the line 3—3 of Figure 2;

Figure 4 is a fractional section taken substantially on the line 4—4 of Figure 2;

Figure 5 is a fractional section taken substantially on the line 5—5 of Figure 2;

Figure 6 is a fractional sectional view to enlarged scale illustrating details in the construction of the rotor of the instrument;

Figure 7 is a schematic view illustrating one ohmmeter type of circuit for the present compensated instrument;

Figure 8 is a schematic view illustrating a second ohmmeter type of circuit for the present compensated instrument;

Figure 9 is a front view of an uncompensated d'Arsonval type of measuring instrument according to my invention;

Figure 10 is an elevational view, with parts in section, of the instrument of Figure 9; and Figure 11 is a fractional section taken substantially on the line 11—11 of Figure 10.

The compensated form of measuring instrument shown in Figures 1 through 6 comprises a tubular shield 10 of non-permanent magnetic material which is counterbored at the ends to provide it with interior annular shoulders 11 and 12. Within this shield at a place about midway the length thereof there is an arcuate or hook-shaped core 13 made also of non-permanent magnetic material which has a uniform width and thickness and is provided with a base 13a at one end that is integrally secured to the shield by welding. This core is centered at the axis of the shield and has an annular length at least greater than the scale length of the instrument. In the present embodiment the scale length of the instrument is approximately 250° and the annular length of the core is approximately 280°. The top and bottom sides of the core are machined so as to have opposite faces 14 and 15 which are parallel to each other and at right angles to the axis of the shield.

In the bottom of rearward portion of the shield there is mounted an electromagnet 16 comprising a spool 17 of non-permanent magnetic material and a compensating coil 18 of enameled copper wire wound on this spool. The bottom circular plate 17a of the spool, which is one pole of the electromagnet 16, fits snugly into the counterbore at the bottom of the shield and is staked tightly against the shoulder 12 by peening the bottom rim of the shield at 19 (Figure 2) so as to hold the spoon in concentric relation to the shield. The top circular wall 17b of the spool, which is the second pole of the electromagnet, confronts the face 15 and is machined so as to lie accurately parallel to that face and provide a uniform air gap 19 between it and the core 13. The useful flux of the electromagnet flows from the pole 17b through the gap 19 and returns by way of the core 13 and shield 10 to the pole 17a. In order that leakage flux from the pole 17b to the shield may be small, the pole 17b has a diameter smaller than that of the shield. Also, for localizing the electromagnet and providing a retaining wall for the coil 18, the pole 17b is surrounded by a non-magnetic ring 17c.

In the upper or forward part of the shield 10 there is a permanent magnet 20 of a highly-efficient magnet material such as "Alnico V." This magnet has preferably the shape of the sector of a cylinder but is provided with an axial clearance hole 21 as shown in Figure 4. The magnet is charged along its geometric axis and has an upper pole face 22 which is ground so as to be planar and at right angles to ths axis. This pole face is secured as by soldering to a mounting plate 23 of non-permanent magnetic material which has a clearance slot 23a (Figure 3) to permit assembling of the rotor hereinafter described. This mounting plate fits snugly the counterbore at the top of the shield and is staked against the shoulder 11 by peening over the top edge of the shield as at 24 (Figure 3) so as to hold the magnet in concentric relation to the shield. Additionally, the magnet is angularly located about the axis of the shield, by the engagement of a key 25 of the mounting plate 23 with a slit 26 in the shield, so that the open sector 27 of the magnet is aligned, in the direction of the axis of the shield, with the base 13a and slot 28 of the core 13. Preferably, this open sector 27 of the magnet is approximately as wide as is the combined angular width of the base 13a and slot 28, it being typically about 86°. The bottom face of the magnet is also ground so as to be planar and at right angles to the axis of the magnet and secured to this face, as by soldering, is a sector-shaped pole shoe 29 of non-permanent magnetic material (Figures 2 and 4). This pole shoe has a diameter equal approximately to that of the core 13 and has a planar bottom face which confronts the face 14 and is parallel thereto to provide a uniform air gap 30 between it and the core 13. The pole shoe 29 has, among other functions, that of evenly distributing the flux of the magnet in the gap 30 regardless of minor inhomogeneities in the magnet.

The useful flux of the magnet 20 flows from the pole shoe 29 through the gap 30 and returns by way of the core 13, shield 10 and mounting plate 23 to the magnet. As a means for adjusting the intensity of the flux field in the gap 30, the permanent magnet is surrounded by a magnetic shunt 31 which is an arcuate magnetic member that is mounted on the shield for adjustment lengthwise of the magnet. This mounting is for example carried out by means of screws 32 which pass through slots 33 in the shield and thread into the member 31, there being recesses 34 in the shield at the slots to clear the heads of the screws.

Threaded into the spool 17 at the axis thereof is a screw 35 having a jewel bearing 36 mounted on its inner end. This jewel screw is locked in position by a lock nut 37 on its lower exterior end portion. At the front of the instrument, a bracket 38 is secured to the mounting plate 23 by screws 39. This bracket has an arm 40 turned back on itself and stepped forwardly as shown in Figure 2. Carried by this arm at the axis of the instrument is a jewel screw 41 having a jewel bearing 42 mounted on the inner end thereof. This jewel screw is threaded through the arm and is secured in place by a lock nut 43.

Pivotally mounted in the jewel bearings 36 and 42 is a rotor shaft 44 having pivots 45 at the ends which engage these bearings. Secured as by staking and cementing to the lower portion of this shaft is a holder 46 for a moving coil 47 that surrounds the core 13. This coil is wound on a rectangular frame 48 which has suitable clearance space from the core and which is made of a highly-conductive metal so that by its cutting of the magnetic flux in the gaps 19 and 30 it will effectively damp the movements of the rotor. Preferably, aluminum is used which is anodized to provide it with an adherent insulating film before the coil is wound thereon. The moving coil has two lead wires 49 and 50 which are wound around the shaft to the upper part thereof. These lead wires are connected to respective terminals 51 and 52 of which the lower terminal is mounted in an insulating bushing 53 that is cemented on the shaft 44. To this terminal is connected the inner end of a standard instrument spring 54. The outer end of this spring is anchored to a terminal lug 55 which is mounted insulatedly on the plate 23. To this lug is connected one lead wire 56 for the instrument. The terminal 52 is staked to a sleeve 57 that is press-fitted on and cemented to the upper end portion of the shaft 44. The inner end of a standard instrument spring 58 is secured to this terminal 52 and the outer end of this spring is secured to a terminal lug 59 which is mounted in an insulating bushing 60 that is in turn mounted on the upper part of the jewel screw 41, above the arm 40, it being retained thereon and held frictionally against the arm 40 by a nut 61 which is tightened down onto the jewel screw 41 against a spring washer 62 intervening between it and the bushing 60. Connected to the lug 59 is a second lead wire 63 for the instrument. It may be noted that although in this construction the lead wire 63 has an electrical connection to the shaft 44 through the sleeve 57, the lead wire is insulated from the frame of the instrument because the shaft pivots in insulating bearings 36 and 42.

Also staked to the upper part of the sleeve 57 is a pointer 64. This pointer is directed oppositely to the coil 47 so that it partially counterbalances the weight of the coil. For further counterbalancing the weight of the coil to statically balance the rotor, a balance cross 65 is staked to the lower part of the sleeve. This cross may have a central member aligned with the pointer 64 and two side arms on each of which there is mounted adjustably a spring weight 66 such as is commonly used in the art. The pointer overlies a dial 67 which is held by screws 68 onto the bracket 38. This dial is provided with scale graduations 69 in whatever the instrument is to measure. In the present instrument these graduations are in temperature from −50° C. to 75° C.

The magnet 20 is preferably magnetized after it is permanently mounted in place within the shield 10 and while the magnetic shunt 31 is in an uppermost position. After it is magnetized, the magnetic shunt is moved once to its lowermost position and then returned so as to produce a slight demagnetization of the magnet for stabilizing its magnetic characteristics. Thereafter the member 31 is adjusted only as is necessary to set the intensity of the magnetic field in the gap 30 to the desired value for optimum performance of the instrument as is hereinafter explained. Following the magnetization of the magnet, the rotor is mounted in place by passing the coil 47 through the slot 23a of the mounting plate 23, the open sectors of the magnet 20 and shoe 29 and the slot 28 of the core 15.

The springs 54 and 58 not only conduct the current to and from the moving coil, but they also provide the return torque for the rotor, which return torque is in a counterclockwise direction as the instrument is viewed in Figure 1. The forward or clockwise driving torque is produced by the interaction between the current in the coil 47 and the magnetic fields which are produced in the air gaps 19 and 30. A feature of the present instruments of my invention, which contributes to their simplicity of structure and which enables them to be made very accurately, is in providing uniform air gaps for the moving coil which are formed by parallel surfaces at right angles to the axis of the instrument. Thus, the useful flux in these gaps is parallel to the axis of the instrument and interacts with the portions of the moving coil which are transverse to its pivot axis. Since the moving coil is turned through the magnetic fields in the separate air gaps 19 and 30, the effective driving torque equals the algebraic sum of the torque components produced by the interaction of these respective fields on the coil. In the present compensated instrument the torque component caused by the electromagnet opposes that caused by the permanent magnet and is utilized to compensate the instrument for a varying voltage supply when the instrument is used in an ohmmeter type of circuit.

In Figure 7 there is shown an ohmmeter type of circuit in which the present compensated instrument may be employed to measure resistance, or conditions or quantities representable in terms of resistance, without errors in the indications caused by variation in the supply voltage. This circuit comprises a Wheatstone bridge 70 having one branch including a variable resistor 71 and a fixed resistor 72 in series and a second parallel branch including two fixed resistors 73 and 74 in series. The branches are energized by a direct-current source 75. Connected across the branches is the moving coil 47 and in series with the coil is a calibrating resistance 47a This type of circuit is particularly useful for indicating temperature at a distance, as on aircraft, in which case the variable resistance comprises a standard resistance bulb preferably of the type disclosed in the aforementioned Kelly patent. As the resistance 71 varies the degree of unbalance of the bridge is changed to produce corresponding changes in the current through the coil 47. Typically, the energizing source 75 is a battery. Since the voltage of batteries falls as they become discharged, the varying supply voltage will also produce current changes in the coil 47. These current changes are not a function of the resistance 71 or the temperature of that resistance and have therefore to be compensated in order that the meter will indicate without error.

The electromagnet 16 is arranged to provide the necessary compensation for the varying supply voltage and is connected in a part of the meter circuit wherein the current is substantially uninfluenced by variations in the resistance 71. If the resistance 71 is small relative to the series resistance 72, this compensating coil may be connected in series with the bridge as shown in Figure 7. Alternatively, the coil may be connected through a voltage cut-down resistance 18a directly across the current source as shown in Figure 8. The coil is arranged to produce a flux field in the gap 19 which is weaker than that produced by the permanent magnet in the gap 30 and is so polarized that its torque reaction on the moving coil opposes that of the permanent magnet. For these conditions, it can be readily shown that upon proper proportioning of the strengths of the magnetic fields in the gaps 19 and 30, the meter will indicate without substantial error caused by varying supply voltage over a range of at least 25% change in the normal value of that voltage. For instance, let M be the induction in the gap 30 produced by the permanent magnet, and $n$ be the induction in the gap 19 produced by the electromagnet. Since these fields oppose one another in respect of their influence on the moving coil, the effective driving torque is proportional to $$i(M-n)$$

where $i$ is the current in the moving coil. If the supply voltage is changed by a factor $f$, the current $i$ in the coil becomes "$if$" and the field in the gap 19 becomes $fn$ so that the effective driving torque becomes $$if(M-fn)$$

In order for the deflection to remain unchanged, it follows that these mathematical expressions should be equal. On setting them equal to each other and solving the equation, it is found that $$\frac{M}{n}=1+f$$

This simple analysis shows that the indications may be without error for any two supply voltages. A more complete analysis shows—and has been verified by actual test—that for a minimum scale error the quantity $$\frac{M}{n}$$

where $n$ is the induction in the gap 30 for approximately the maximum supply voltage used, should be equal approximately to 1.83, and that when this value is used the maximum scale error for an approximately 25% overall change in supply voltage is less than ±1%. The setting of the flux fields in the gaps 19 and 30, so that they satisfy the relationship $$\frac{M}{n}=1.83$$

is accomplished in practice by adjusting the magnetic shunt 31 so that there is obtained the least displacement of the pointer from a given scale position as the supply voltage is varied over the operating range.

The core 13 is operated at near saturation while the instrument is in use. Because the flux of the electromagnet opposes that of the permanent magnet in the core, the core is more than saturated when the electromagnet is deenergized as when the instrument is not in use. In order that this saturation of the core will not produce a demagnetizing effect on the permanent magnet and disturb the calibration of the instrument, the magnetic circuit of the permanent magnet is arranged so that the magnet is loaded by leakage flux. This is accomplished by extending the pole shoe 29 beyond the periphery of the magnet to provide a suitably narrow gap between the shoe and the shield 10 as shown in Figure 2.

In order that hysteresis effects will be at a minimum it is important that all magnetic parts which carry a flux of varying magnitude shall be made of high-permeable low-hysteresis magnetic materials. A suitable material for this purpose is 47% nickel-iron alloy which is heat-treated in a hydrogen atmosphere at about 1100° C. On making the shield 10, core 13 and spool 17 of this material the hysteresis effect on the scale readings for rising and falling supply voltages is less than 1%.

It may be noted that since the flux of the electromagnet is less than that of the permanent magnet in satisfying the relation $$\frac{M}{n}=1.83$$

the wall thickness of the lower part of the shield may be thinner than that of the upper part as shown in Figure 2.

The response characteristic of this instrument is linear with respect to the current in the moving coil provided the reluctances of the gaps 19 and 30 are uniform—i. e., the same at all positions of the rotor coil 47. In the present instrument the faces determining these gaps are all parallel and at right angles to the axis of the instrument and may therefore be very accurately located so that the instrument will have a linear response characteristic relative to the current in the moving coil. The response of this instrument is also substantially linear with respect to the temperature of the resistance 71, considering this to be a resistance bulb of the character abovementioned, because in practice the current response in the moving coil is substantially linear with respect to the temperature of the resistance bulb. Therefore it follows that the scale graduations in temperature are also substantially uniformly spaced.

To calibrate this instrument relative to a printed scale of substantially uniform graduations, it is only necessary to adjust the terminal lug 59 to set the pointer at zero on the scale, to shift the magnetic shunt until the relation $$\frac{M}{n}=1.83$$

is substantially satisfied and then to vary the resistance 47a so as to set the sensitivity of the instrument to the desired value.

By way of illustration, the components of the present compensated instrument may suitably have the following approximate dimensions and values: shield 10, approximately 1⅜" long by 1" diameter with wall thickness in the upper portion of .090" and a wall thickness in the lower portion of approximately .050"; core 13, .7" diameter by ¼" wide by ₃⁄₁₆" thick; permanent magnet 20, .55" diameter by .37" long with an open sector approximately 86° wide; pole 17a approximately .9" diameter, pole 17b approximately .7" diameter and coil 18 approximately 2600 turns of No. 37 Formvar insulated copper wire; gaps 19 and 30 each .045" long; moving coil 47, 317 turns of No. 45 wire having approximately 99 ohms; coil frame 48, .010" thick by .090" wide with inside dimensions to provide suitable clearance with respect to the core 13; resistance of bulb 71, 74 ohms at −50° C., 90 ohms at 0° C. and 118 ohms at 75° C.; resistors 72 and 74 each 590 ohms and resistor 73, 67 ohms. When the circuit of Figure 8 is employed, and the voltage source is approximately 14 volts, the resistance of the compensating coil 18 and the series resistance 18a may total approximately 700 ohms.

It will be understood that the instrument above described may be utilized as a long-scale d'Arsonval type of instrument without compensation simply by leaving the electromagnet 16 to remain idle, and that the instrument may be converted into such uncompensated d'Arsonval type of instrument by removing the lower section of the shield 10 below the core 13 and the electromagnet 16. In Figures 9 through 11, however, I show a simplified modification of such long-scale uncompensated d'Arsonval type of instrument according to my invention. This instrument has a unitary cast frame 80 which includes a disk-like base 81, a standard 82 extending from one side of the base at right angles thereto, a hook-shaped core 83 leading from the standard and having a planar bottom face 83a substantially parallel to the base, and an arm 84 leading from the standard and overhanging the core at the side thereof opposite the base. Mounted on the base, and secured thereto as by soldering, is a cylindrical permanent-magnet structure 85 including a permanent magnet, preferably of "Alnico V," charged along its geometric axis and coaxial with the core 83, and a soft iron pole shoe 86 of a disk shape which confronts the core 83. This pole shoe has a planar face 86a that is parallel to the bottom face of the core to provide a uniform air gap 87 between the shoe and the core. In this construction the effective magnetic circuit is from the pole shoe 86 through the gap 87, the core 83, standard 82, base 81 and back through the magnet. Because the flux in this circuit is constant, any easily-cast high-strength iron or steel may be used for the frame.

At the center of the core there is a rotor shaft 88 pivoted at its ends in lower and upper jewel bearings 89 and 90. The lower jewel bearing 89 is threaded into the central portion of the pole shoe 86 and the upper jewel bearing is threaded through the arm 84 and held in place by a lock nut 91. The shaft 88 carries a rectangular frame 92, preferably of aluminum, which surrounds the core 83 at a clearance distance therefrom. Wound on this frame is a coil 93 which is the moving coil of the instrument. The lead wires of the coil are connected to respective terminals 94 and 95 of which the terminal 94 is mounted in an insulating bushing 96 that is cemented on an intermediate part of the shaft 88 and the terminal 95 is staked to the top part of a sleeve 97 that is press-fitted on and cemented to the top part of the shaft. The inner end of a standard instrument spring 98 is connected to the terminal 94 and the outer end of this spring is connected to a pin 98 that is mounted insulatedly on the core 83. To this pin there is connected one lead wire 100 for the instrument. The inner end of a second standard instrument spring 101 is connected to the terminal 95 and the outer end of this spring is connected to a terminal lug 102. This lug is mounted on an insulating bushing 103 which surrounds the jewel bearing 90 and is held frictionally in place by insulating washers 103a which are pressed thereagainst by the lock nut 91. To this terminal lug is connected a second lead wire 104 for the instrument.

Staked to the upper part of the sleeve 97 is a pointer 105 which overlies a dial 106 that is held mounted on shoulders 107 of the standard 82 by screws 108 (Figure 11). Below the dial and staked to the sleeve 97 is a balance cross 109 carrying adjustably mounted spring-type weights 110 for balancing the rotor.

It will be understood that the rotor is mounted by passing the coil through a slot 83a of the core shown in Figure 11 and then inserting the jewel screw 90 and tightening it down to the desired relation to the pivots of the rotor shaft. The return torque on the rotor is supplied by the two instrument springs 98 and 101 and can be adjusted by shifting the terminal lug 102 in the bushing 103 upon slightly loosening the lock nut 91. The driving torque, which is in a clockwise direction on viewing the instrument in Figure 9, is generated by the interaction of the current in the bottom leg of the coil with the flux in the gap 87. Upon the flux in the gap being of uniform density, the driving torque will be proportional linearly with respect to the current in the moving coil and the instrument will indicate relative to uniformly-spaced graduations 111 on the dial. Since the uniformity of the flux field in the gap depends upon the parallelism between the planar surfaces 83a and 86a, and these surfaces can be held in parallel relation by close tolerances, instruments of the character herein described con be constructed in quantity production to operate with a high degree of accuracy. Also, these instruments are of very simple construction and can therefore be made very cheaply.

The particular embodiments of my invention hereinabove described are intended to be illustrative and not necessarily limitative of my invention as the same are subject to changes and modifications without departure from the scope of my invention, which I endeavor to express according to the following claims.

I claim:

1. In an electrical measuring instrument: the combination of a pivoted coil offset from its pivot axis, a core of non-permanent magnetic material having an arcuate portion centered at said pivot axis and passing through said coil, said core having a planar face substantially at right angles to said pivot axis, a permanent magnet having a pole face spaced from and parallel to said face of said core to form a uniform air gap therebetween, said magnet being charged on an axis parallel to said pivot axis, a tubular shield of non-permanent magnetic material surrounding said magnet and core and centered at said pivot axis, a base portion of said arcuate core being magnetically coupled and rigidly secured to an interior wall of said shield, and non-permanent magnetic means magnetically coupling one end of said shield to the other pole of said permanent magnet.

2. The combination set forth in claim 1 including an arcuate member of non-permanent magnetic material around said permanent magnet and mounted on said shield for adjustment lengthwise of said magnet for adjusting the induction in said air gap produced by said magnet.

3. In an electrical measuring instrument: the combination of a pivoted coil offset from its pivot axis, an arcuate core of non-permanent magnetic material passing through said coil and centered at said pivot axis, said core having a planar face substantially at right angles to said pivot axis, a permanent magnet structure having a pole face confronting said core face in parallel relation thereto to provide a uniform gap therebetween, and magnetic means about said magnet and adjustable therealong for varying the magnetic induction produced by the magnet in said gap.

4. In an electrical measuring instrument: the combination of a tubular shield of magnetic material, an arcuate core axially positioned in said shield and joined at one end to the shield, a coil surrounding said core and pivotally supported at said axis, an electromagnet having a pole face confronting one side of said core to provide an air gap therebetween, a permanent magnet of generally cylindrical shape concentrically arranged in said shield at the other side of said core and charged along the geometric axis thereof, means connecting the outer pole end of said magnet to said shield, and a pole shoe of non-permanent magnetic material on the inner end of said magnet and spaced from said core to provide an air gap therebetween, said pole shoe extending beyond the periphery of said magnet towards said shield to provide a leakage flux path in shunt with said second-mentioned air gap for loading said permanent magnet so that flux variations in said core produced by said electromagnet will not substantially influence the magnetic characteristics of said permanent magnet.

5. In an electrical measuring instrument: the combination of an arcuate core of non-permanent magnetic material having planar faces at right angles to its central axis, a coil surrounding said core in spaced relation thereto and pivoted at said axis, a permanent magnet having a pole face confronting one of the planar faces of said core to provide a uniform air gap therebetween, an electromagnet having a pole face confronting the other planar face of said core to provide also a uniform air gap therebetween, and non-permanent magnet means joining the other pole ends of said magnet and electromagnet to one end of said arcuate core.

6. In an electrical measuring instrument: the combination of an arcuate core having opposite planar faces parallel to each other, a coil surrounding said core and pivoted at the center thereof on an axis at right angles to said faces, a permanent magnet charged along its longitudinal axis and coaxially positioned with said pivot axis at one side of said core, said magnet having a sector-shaped pole shoe with a planar pole face confronting one of said faces of said core to form a uniform air gap therebetween, an electromagnet coaxially positioned with said pivot axis at the other side of said core and having a planar pole face confronting the other face of said core to provide a uniform air gap therebetween, a member of non-permanent magnetic material parallel to said pivot axis and having a central portion secured to one end of said arcuate core, and magnetic means at the ends of said magnetic member for completing the magnetic circuits of said permanent magnet and electromagnet by way of said magnetic member, arcuate core and respective air gaps.

7. In an electrical measuring instrument: the combination of a tubular magnetic shield of non-permanent magnetic material, a core inside said shield and integral therewith, said core having an arcuate portion centered at the axis of said shield in a position substantially midway the length of the shield, said arcuate portion having opposite planar faces substantially at right angles to said axis, a coil surrounding said core and pivoted at said axis, a permanent magnet of the shape of a sector of a cylinder located in one end portion of said shield and having a planar pole face confronting one face of the arcuate portion of said core in parallel relation thereto and having a second pole of the shape of the sector of a disk which is joined to the rim of said shield at one end thereof, said magnet and core being aligned to provide a mounting opening for installing and removing said coil, and an electromagnet in the other end portion of said shield having a pole face confronting the other face of the arcuate portion of said core in parallel relation thereto, said last-mentioned pole face being spaced from the interior wall of said shield and said electromagnet having a second pole joined to said other end portion of said shield.

8. A moving-coil type of electrical instrument comprising an arcuate core piece of non-permanent magnetic material less than 360° in length, a coil embracing said core piece and mounted for rotation therealong about a pivot axis which is at the axis of the core piece, a first magnetic circuit comprising said core, a permanent magnet and pole piece at one side of said coil in all positions of the coil, and a second magnetic circuit exclusive of said permanent magnet and comprising said core, an electromagnet and a pole piece at another side of said coil in all positions of the coil.

9. A moving-coil type of electrical instrument comprising an arcuate core piece of non-permanent magnetic material less than 360° in length, a coil embracing said core piece and mounted for rotation therealong about a pivot axis which is at the axis of the core piece, a first pole piece at one side of said coil and confronting said core, a permanent magnet connected between said first pole piece and one end of said core, a second pole piece at another side of said coil and confronting said core, an electromagnet, and non-permanent magnetic means connecting said electromagnet between said second pole and said one end of said core.

10. A moving-coil type of electrical instrument comprising an arcuate core of magnetic material less than 360° in length and having opposite flat parallel surfaces at the opposite sides thereof, a coil embracing said core and pivoted for movement therealong about an axis which is at the axis of the core, pole pieces at opposite sides of said core having flat parallel faces confronting the core, a permanent magnet having one pole joined to one of said pole pieces, an electromagnet having one pole joined to the other of said pole pieces, and non-permanent magnetic means joining the other poles of said permanent magnet and electromagnet to one end of said core.

JACOB L. ZAR.

REFERENCES CITED

The following references are of record in the file of this patent:

UNITED STATES PATENTS

| Number | Name | Date |
|---|---|---|
| 1,022,517 | Thomson | Apr. 9, 1912 |
| 1,479,524 | Van Guilder | Jan. 1, 1924 |
| 1,695,424 | Harrison | Dec. 18, 1928 |
| 1,847,936 | Faus | Mar. 1, 1932 |
| 2,077,186 | Rich | Apr. 13, 1937 |
| 2,409,963 | Smith | Oct. 22, 1946 |

FOREIGN PATENTS

| Number | Country | Date |
|---|---|---|
| 456,988 | Great Britain | Nov. 19, 1936 |